Figure 1:
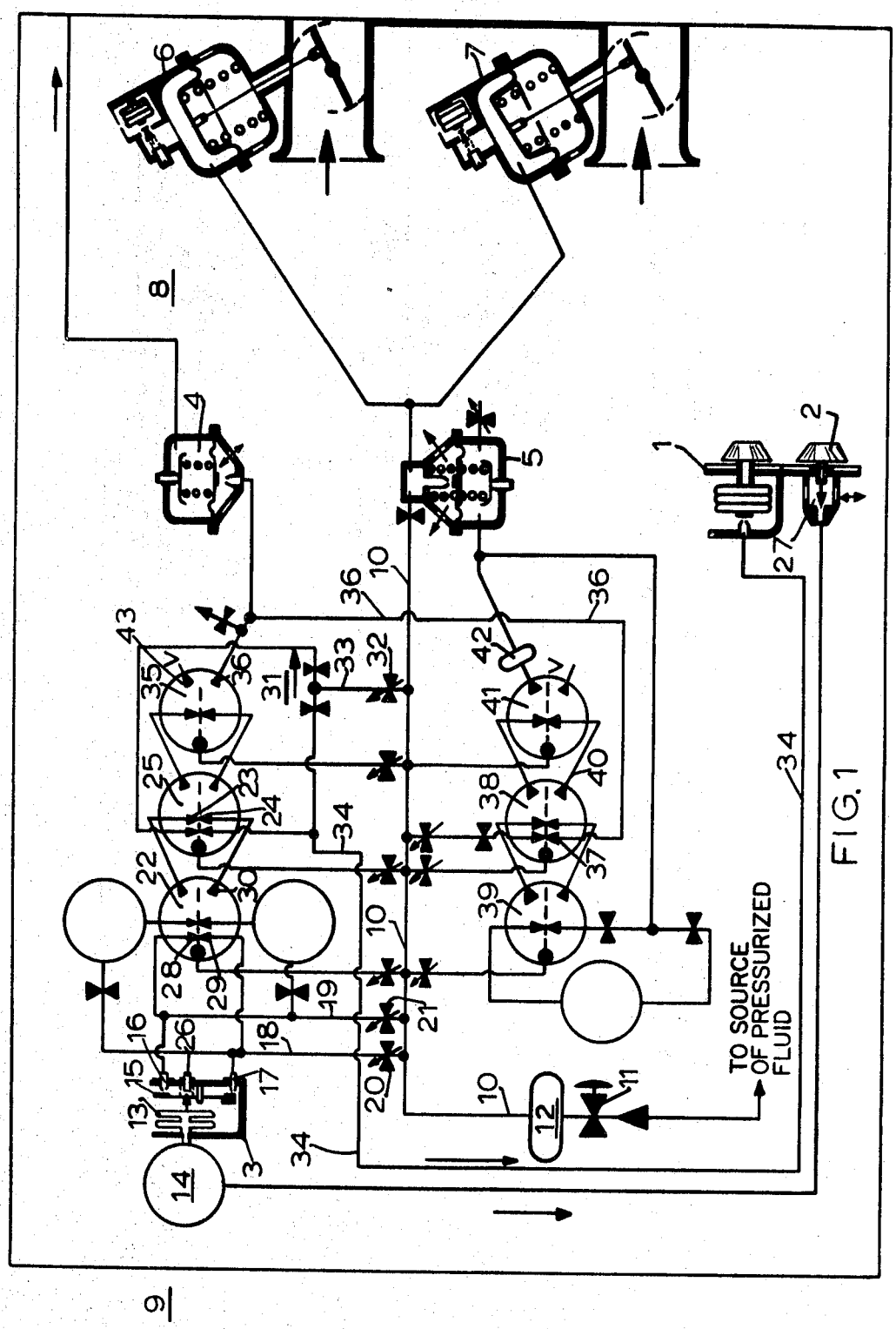

United States Patent

[11] 3,559,559

| [72] | Inventors | Owen D. Furlong<br>East Coker, Somerset;<br>Cyril Thomas Priscott, Yeovil, Somerset, England |
|---|---|---|
| [21] | Appl. No. | 792,058 |
| [22] | Filed | Jan. 17, 1969 |
| [45] | Patented | Feb. 2, 1971 |
| [73] | Assignee | Westland Aircraft Limited<br>Yeovil, Somerset, England |
| [32] | Priority | Jan. 25, 1968 |
| [33] | | Great Britain |
| [31] | | 3849/68 |

[54] FLUIDIC PRESSURIZATION CONTROL SYSTEM FOR CHAMBERS
15 Claims, 4 Drawing Figs.

[52] U.S. Cl. .................................................. 98/1.5, 137/81.5
[51] Int. Cl. ............................................ B64d 13/04

[50] Field of Search .......................................... 98/1.5; 137/81.5

[56] References Cited
UNITED STATES PATENTS
| 2,632,374 | 3/1953 | Klemperer ................... | 98/1.5 |
| 3,452,665 | 7/1969 | Furlong ...................... | 98/1.5 |

Primary Examiner—Meyer Perlin
Attorney—Larson, Taylor and Hinds

ABSTRACT: A fluidic pressure control system includes a capsule which is externally sensitive to direct environmental changes within a space such as an airplane cabin and internally sensitive to preselectively controlled environmental changes, a mass balanced beam pivotable responsive to expansion and contraction of the capsule, and a pair of fluid-actuated valves controlled by movement of the beam. The valves are connected to first and second control nozzles of a fluid amplifier and the output of the valves is used in controlling the pressure within the environmental space.

FLUIDIC PRESSURIZATION CONTROL SYSTEM FOR CHAMBERS

This invention relates principally but not exclusively to a pressure control system actuated by fluid-operated logic devices, and its means for sensing rate of change in pressure.

It is an object of the invention to improve the operational characteristics of a fluid pressurization system fitted in large cabin areas or large chambers.

It is a further object of the invention to improve the sensitivity of a fluidic pressurization control system in regard to rate of change of pressure.

According to the invention, there is provided a rate of environmental change sensing device comprising a capsule, a mass balanced beam and valve assembly, said capsule being externally sensitive to direct environmental changes and internally sensitive to controlled environmental changes, the movement of said capsule and said beam cooperating with said valve assembly providing a signal indicative of rate of environmental change.

In another aspect of the present invention there is provided a fluid-operated pressure control system comprising a chamber, pressure increasing means and pressure decreasing means, a fluid amplifier including a power nozzle for a flow of power fluid, a plurality of outlet apertures for said power fluid and at least one control nozzle for a flow of control fluid which interacts with said flow of power fluid from said power nozzle to control the direction of said flow of power fluid with respect to said apertures, a rate of chamber pressure sensor comprising a capsule, mass balanced beam and pad valve assembly which operates to vary the flow of control fluid to the control nozzle of said fluid amplifier to control the flow of power fluid to said apertures, means responsive to flow of power fluid from said apertures to actuate at least one of said pressure increasing means and said pressure decreasing means to adjust chamber pressure towards a predetermined value.

Figure 2:
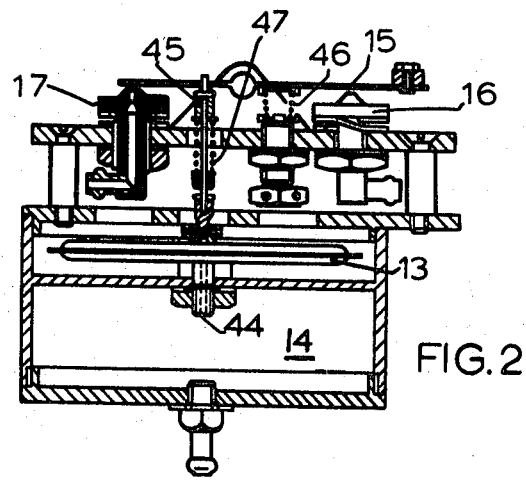
Figure 3:
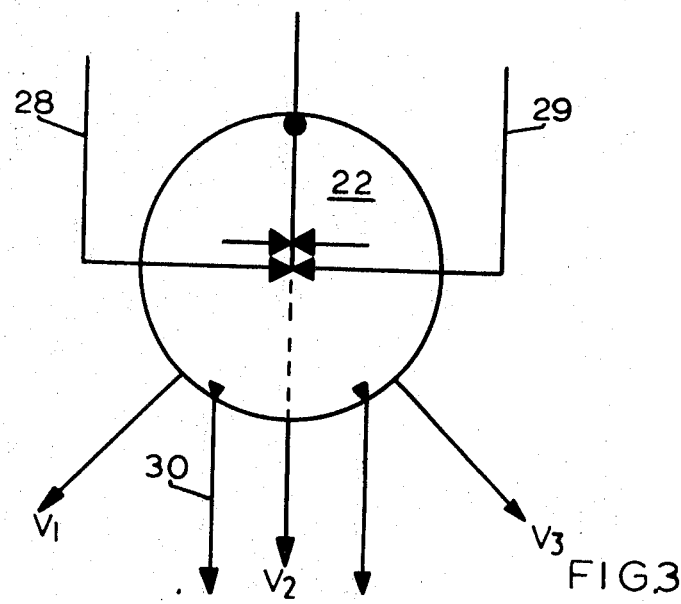
Figure 4:
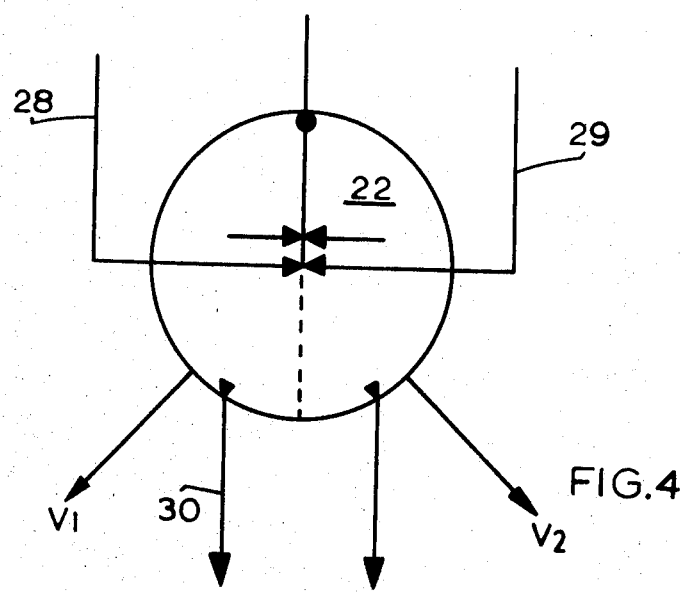

One aspect of the invention will be described with reference to the appended drawings in which:

FIG. 1 discloses an improved rate of pressure change control in association with an aircraft pressurization system, FIG. 2 shows a more detailed form of the capsule operated rate sensor shown in FIG. 1, and FIGS. 3 and 4 are diagrammatic representations of suitable vented amplifiers for use in the system of FIG. 1.

The circuit diagram of FIG. 1 shows a conditioning system for a cabin or aircraft compartment. Power to operate the system is supplied from a compressor (not shown), which also provides the fluid for pressurizing the compartment but may be a tapping from the aircraft engine. The system includes a cabin altitude selector 1, rate selector 2, rate sensor 3, maximum differential pressure sensor 4, output power relay 5, and a pair of discharge valves 6 and 7. These discharge valves control the outlet of air from the cabin 8 to ambient 9 around the cabin, and are pneumatically operated under the control of a fluid amplifier system within the cabin. All the fluidic components are supplied from a single manifold 10 via reducing valve 11 and main filter 12.

In operation, with the aircraft ascending, the cabin altitude is also ascending, the cabin altitude selector 1 is tending to hold the discharge valves 6 and 7 wide open, allowing the cabin altitude to ascend at the same rate as the aircraft altitude. With the rate selector 2 set to any desired rate of cabin pressure change which is less than that occurring under absolute control the following sequence occurs:

As the cabin pressure decreases (cabin altitude increases), the rate of change of pressure is sensed by a rate sensor 3. This sensor comprises a capsule 13, a mass balanced beam 15 and associated pad valve arrangement 16 and 17. As shown, two preset high impedance sources of pressure, tapped from manifold 10 through lines 18 and 19 via restrictors 20 and 21 are used to supply the basic input signals for controlling the rate of cabin ascent and descent. These signals are modulated as required by the controlled leaks to cabin 8, through the two pad valves 16 and 17. They are then processed in a fluid amplifier 22 before being fed to the control jets 23 or 24 of the rate-absolute summing amplifier 25. The output impedance of the rate pad valves 16 and 17 is altered by movement of the small seesaw beam 15, which is pivoted on its centerline and spring loaded to rest against a guided knife edge link on the capsule 13. A preset stop 26 mounted directly over the capsule knife edge prevents the beam and pivots from being overloaded when the system is operating on the maximum cabin differential pressure. The beam provides a convenient method of mass balancing the rate capsule 13, making it insensitive to altitude and G force changes. The inside of the rate capsule 13 is connected to cabin pressure via an additional accumulator 14 and a filtered high impedance restrictor (rate selector 2), adjustable by a crew member. As the cabin pressure decreases, the capsule 13 expands, because the pressure within the capsule and the accumulator 14 cannot change at the same rate as cabin pressure changes, due to the restriction offered by the rate selector needle valve 27. The expansion of the rate sensor capsule 13 tilts the beam 15, so that the pad valve 16 tends to close, and the pad valve 17 tends to open. This results in an increasing signal to the control jet 28, and a decreasing signal to control jet 29 of the first rate feedback amplifier 22, resulting in an increased output signal through output channel 30. This signal is passed to the rate summing amplifier 25 to act on its power stream through control jet 24. This opposes the signal from the absolute selector bridge 31. This bridge 31 is made up of two separate signals, one direct from manifold 10 via restrictor 32 and line 33, and the other from the cabin altitude selector 1 via line 34. The sum of these signals now passes the buffer amplifier 35 to appear as an increased signal at the output 36 of buffer amplifier 35. The signal from this amplifier is transmitted by the summed sensor signal line 36 to control nozzle 37 of the sensor-head signal summing amplifier 38. Here it opposes a preset bias control flow from a stabilization lead circuit amplifier 39, and tends to reduce the output signal from amplifier 38 through output channel 40. This results in a signal decrease from the final amplifier 41 through output channel 42 to relay 5. The pressure drop within the relay 5 results in a lower pressure transfer to the discharge valves 6 and 7, allowing the valves to close further and thereby prevent the cabin pressure from decreasing at a rate faster than that selected.

It must be understood that when the conditions are reversed, i.e., when the aircraft is descending, all the signals and their results are in reverse to that described above.

It will be noted from the circuit that the absolute pressure control bridge 31 is situated on the rate-absolute summing amplifier 25. The output from the element is further amplified in a buffer amplifier 35, which has one leg 43 vented to cabin 8. The output from the other leg 36 is then balanced against a preset biassing jet in the next stage amplifier 38, and is also summed with the output from the "lead" amplifier 39. This latter subcircuit provides a powerful stabilizing feature, which permits operation of the overall system at higher sensitivity, without the onset of hunting. The absolute bridge pressure signal via the buffer amplifier 35 is bled to cabin by the maximum differential pressure sensor 4, the fixed biassing jet previously mentioned than overriding the reduced buffer amplifier output signal opening the discharge valves 6 and 7 against their spring closing force as required.

The small filter 42 on the outlet of the final stage fluid amplifier 41 serves a double purpose. Firstly, it gives additional protection against dirt to the balanced orifices in the lead circuit, and secondly it reduces high frequency signal noise so that this is not further amplified in the lead circuit and passed onto the power relay(s) 5.

The rate sensor according to FIG. 2 is similar in construction to that schematically shown in FIG. 1. The rate of change of aircraft cabin pressure is sensed by a differential capsule 13 in series with an accumulator 14 and orifice 44. As, for example, the cabin pressure decreases when the aircraft is gaining altitude, so the pressure inside the capsule 13 lags cabin pressure; this is due to the time the air takes to bleed from the accumulator 14 via orifice 44. This pressure differential across the capsule 13 causes it to expand and actuate the link pin 45 to move the beam 15. With no rate of climb or descent the beam is held in midposition approximately an equal distance from pad valves 16 and 17. As the aircraft gains altitude one of the pad valves will tend to open, whilst the other will tend to close, giving a pressure difference which from the output of the pad valves is used across the control ports of fluid amplifier 22. A particular controlled rate of climb may be selected by varying the orifice 44 in size, i.e. using a needle valve, thus bleeding air form the accumulator 14. A bias spring 46 is employed to ensure that the capsule always works under compression. To obviate any damage to the beam assembly due to inadvertent overloading by the capsule 13, the link pin 45 has a spring 47 that will compress and take up overload pressure.

It will be obvious to those skilled in the art that certain modifications can be applied without departing from the scope of the invention, for example, the fluid passing through all or part of the system can be a gas or a liquid, depending upon the pressurization requirements. Additional stages of amplification can be interconnected as required, or additional lead-lag for stability. Additional accumulators and restrictors can be added as required, and restrictors can be adjustable, such as needle valves, or fixed, such as orifice or capillary servosystems, can be included when fluid pressures are insufficient to develop the necessary power. Although only one type of amplifier element is shown, this could be varied, and several known types can be used together or individually vented amplifiers may be used to simplify the design so that all the fluid used in an amplifier element need not be accommodated by subsequent elements, but can be vented to space. Suitable vented amplifiers are shown in FIGS. 3 and 4. In FIG. 3 a vented jet interaction beam deflection type amplifier is shown. For convenience, the amplifier is shown as amplifier 22 of FIG. 1. The amplifier is vented at $V_1$, $V_2$ and $v_3$, and is otherwise like amplifier 22 and operates in the same manner. A vented pressure interaction beam deflection type is shown in FIG. 4. In this device the power stream through the power nozzle is deflected by variations in pressures in control conduits 28 and 29, which in this instance are not provided with jets, to vary the flow of power fluid through the outlet apertures. This device is vented at $V_1$ and $V_2$, and functions similarly to the previously mentioned amplifier.

The control method can be applied in any static or mobile enclosure or compartment, such as an aircraft cabin, hyperbaric chamber, spacecraft or submarine installation, and transducers may be used to convert pressure or flow into electrical signals, or vice versa, where required for particular actuators, amplifiers, sensors, or transmission systems. The rate control system can be applied to any change of environment, i.e. temperature pressure, flow or humidity, and the fluidic system modified, where necessary. A system can also include more mechanical or electrical devices, if required, although this would introduce some of the problems associated with previous systems. An aircraft system could include a master discharge valve, a slave discharge valve, and a double relay, the master valve being situated in close proximity to said relay so as to respond quickly to pressure surges through the system, and the slave valve positioned remote from the relay to respond substantially slower, and, therefore, provide a control on the flow distribution throughout the cabin.

We claim:

1. A fluidic control system for controlling changes within an environmental space comprising a rate of environmental change sensing device comprising a capsule externally sensitive to direct environmental changes and internally sensitive to preselectively controlled environmental changes, means for selectively controlling the sensitivity of said capsule to internal environmental changes, a mass balanced beam pivotable responsive to expansion and contraction of said capsule, and fluid-actuated valve means responsive to the movement of said capsule, and hence to the corresponding movement of said mass balanced beam, for producing a fluidic control signal indicative of the rate of environmental change; and control means responsive to said control signal for controlling changes in the environmental space in accordance with said control signal.

2. A system as claimed in claim 1 wherein said control means includes at least one fluid amplifier having a power nozzle for producing a flow of power fluid, at least one control nozzle for producing a flow of control fluid which interacts with said flow of power fluid from said power nozzle to control the direction of said flow of power fluid with respect to at least one outlet aperture.

3. A system as claimed in claim 2 wherein said control means includes a chamber, pressure increasing means, pressure decreasing means, means responsive to the flow of power fluid from said outlet aperture, to actuate at least one of said pressure increasing means and said pressure decreasing means to adjust chamber pressure towards a predetermined value.

4. A system as claimed in claim 2 wherein said fluidic control system comprises a fluid-operated pressure control system for controlling environmental changes within an aircraft cabin.

5. A system as claimed in claim 2 wherein said fluidic control system comprises a fluid-operated pressure control system for controlling the pressure within a hyperbaric chamber.

6. A system as claimed in claim 1 wherein said control signal is applied to the control nozzles of a fluid amplifier.

7. A system as claimed in claim 1 wherein said capsule is adjustably positioned to actuate said valve means at a predetermined pressure.

8. A fluid-operated pressure control system comprising a chamber, pressure increasing means and pressure decreasing means, a fluid amplifier including a power nozzle for a flow of power fluid, a plurality of outlet apertures for said power fluid, and at least one control nozzle for a flow of control fluid which interacts with said flow of power fluid from said power nozzle to control the direction of said flow of power fluid with respect to said apertures, a rate of chamber pressure sensor comprising a capsule, mass balanced beam and pad valve assembly which operates to vary the flow of control fluid to the control nozzle of said fluid amplifier to control the flow of power fluid to said apertures, means responsive to flow of power fluid from said apertures to actuate at least one of said pressure increasing means and said pressure decreasing means to adjust chamber pressure towards a predetermined value.

9. A fluid-operated pressure control system as claimed in claim 8, wherein said capsule is externally sensitive to direct pressure change and internally sensitive to controlled pressure change, the resulting movement of said capsule in response to pressure change, and cooperating with said mass balanced beam and pad valve assembly providing a signal indicative of the rate of change in pressure.

10. A fluid-operated pressure control system as claimed in claim 9, wherein the internal pressure of said capsule is controlled by manually operated rate selector means.

11. A fluid operated pressure control system as claimed in claim 8, including a differential pressure sensor which senses internal chamber pressure and ambient pressure around said chamber and presents a resultant output signal at a control nozzle of a fluid amplifier tending to divert the power flow of said amplifier and thereafter actuating means which maintain the differential pressure within a predetermined value.

12. A fluid-operated pressure control system as claimed in claim 11, wherein said sensor actuates a discharge valve to open and thereby reduce said differential pressure.

13. A fluid-operated control system as claimed in claim 8, wherein said power fluid and said control fluid comprise air.

14. A fluid-operated control system as claimed in claim 8, wherein said system utilizes beam deflection pressure interaction vented amplifiers.

15. A fluid operated control system as claimed in claim 8, wherein said system utilizes beam deflection jet interaction vented amplifiers.